United States Patent [19]

Papacek

[11] 3,943,963
[45] Mar. 16, 1976

[54] FROSTPROOF HYDRANTS FOR USE IN FLUID HANDLING

[76] Inventor: Frank C. Papacek, 3 N. 410 Maple Court, West Chicago, Ill. 60185

[22] Filed: Apr. 24, 1974

[21] Appl. No.: 463,447

[52] U.S. Cl. ............... 137/283; 137/295; 137/307; 137/360
[51] Int. Cl.² .......................................... E03B 9/14
[58] Field of Search ............... 137/272, 280–284, 137/295, 300–307, 326, 327, 454.5, 454.6, 360

[56] References Cited
UNITED STATES PATENTS

| | | |
|---|---|---|
| 204,010 | 5/1878 | Donahoe.......................... 137/295 |
| 304,204 | 8/1884 | Kaiser............................... 137/283 |
| 601,378 | 3/1898 | Kaiser............................... 137/283 |
| 1,124,455 | 1/1915 | Kemp et al. ..................... 137/283 |
| 2,649,111 | 8/1953 | Anderson......................... 137/304 |

Primary Examiner—Martin P. Schwadron
Assistant Examiner—Richard Gerard
Attorney, Agent, or Firm—Hill, Gross, Simpson, Van Santen, Steadman, Chiara & Simpson

[57] ABSTRACT

An improved frostproof hydrant having a readily removable valve seat-valve body assembly which may be easily replaced from the nozzle end of the hydrant as a single unit or as a portion thereof without any special alignment.

18 Claims, 11 Drawing Figures

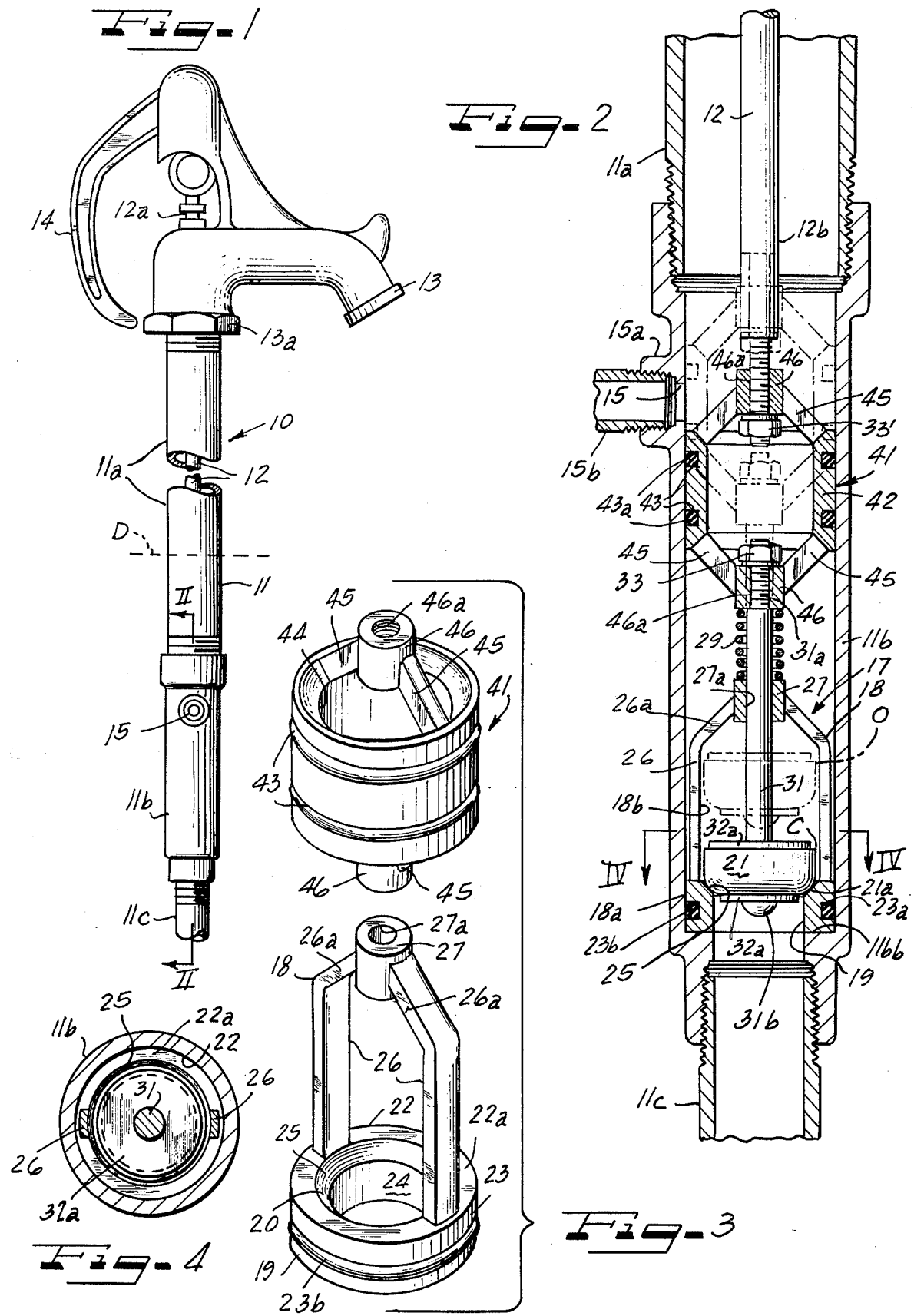

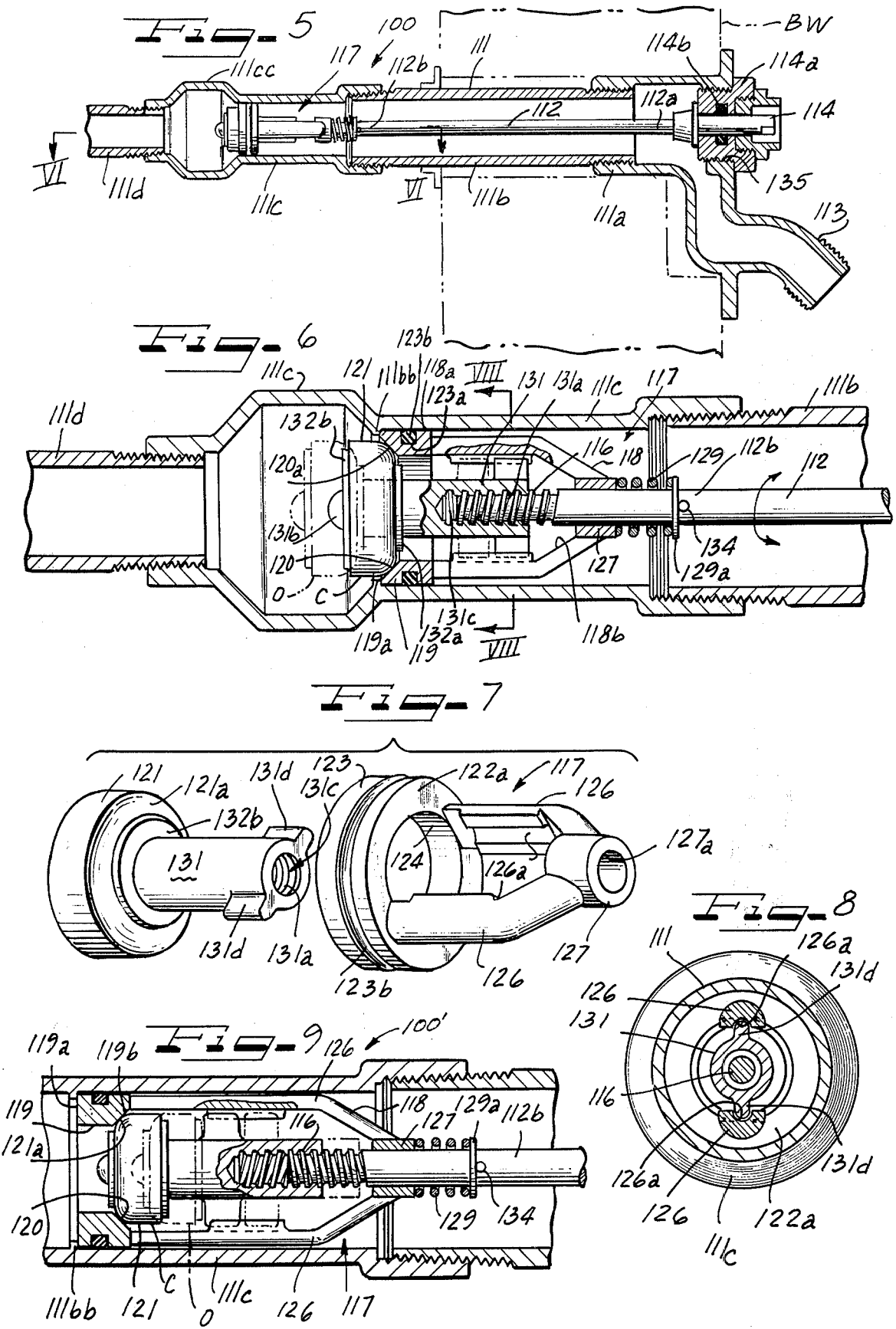

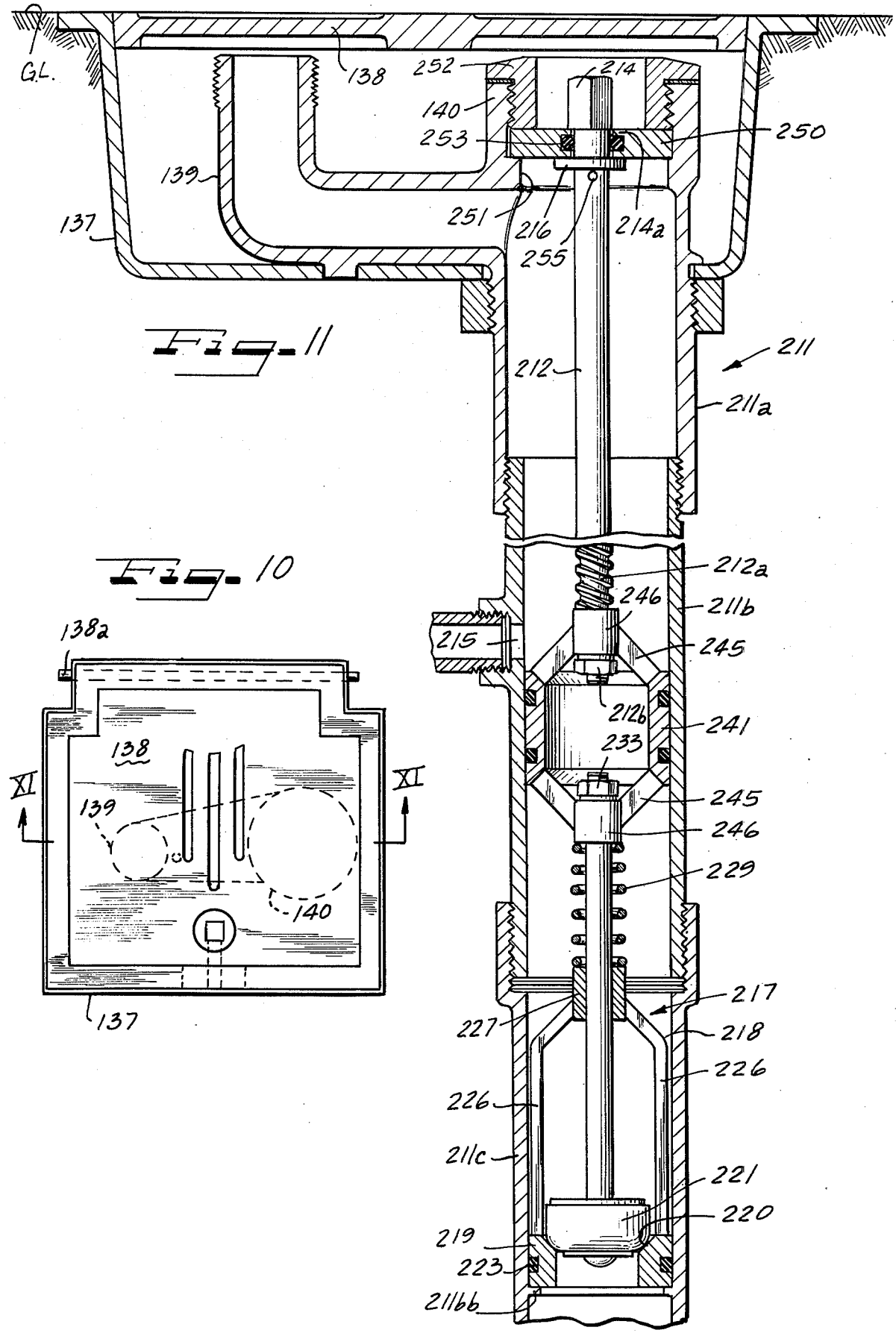

FROSTPROOF HYDRANTS FOR USE IN FLUID HANDLING

BACKGROUND OF THE INVENTION

1. Field of the Invention

The invention relates to fluid handling hydrant structures and somewhat more particularly to hydrant structures which are at least partially exposed to varying climatic conditions and require protection against freezing.

2. Prior Art

Various types of frostproof hydrant structures are known. For example, I have disclosed and claimed a sanitary frostproof hydrant structure in my U.S Pat. No. 3,017,896.

Known frostproof hydrant structures generally comprise an elongated casing for guiding a fluid, such as water, from a source thereof to a nozzle or point of demand, a value mechanism for selectively allowing and preventing fluid flow from the source to the point of demand and a means for selectively activating the valve mechanism. The valve mechanism includes a valve body and a valve seat located within the casing and substantially below the frost-line in ground or substantially within an outer wall or the like of a structure so as to be protected from freezing during varying climatic conditions. During normal usage, the valve body and/or valve seat become worn and must be periodically inspected and/or replaced. However, in prior art structures, valve bodies and valve seats are separate components which are separately attached to a hydrant casing and both must be searately removed from the casing for inspection and/or replacement. Such valve mechanisms are relatively inaccessible and the inspection and/or replacement operations require one to work from a position substantially remote from the valve mechanism. This frequently results in improper alignment of the various portions of the valve mechanism and/or results in failure of the hydrant so that, for example, the supporting wall must be torn down or the ground must be dug up to expose the casing portion of the hydrant which encompasses the valve mechanism. Of course, after inspection and/or replacement of a valve mechanism, the wall must be rebuilt or the dug-up ground replaced with the accompanying expenses.

SUMMARY OF THE INVENTION

The invention provides an improved frostproof hydrant structure which includes a readily removable valve seat-valve body assembly. The unitary valve seat-valve body assembly is easily removed and/or replaced within a hydrant casing without alignment since the assembly is coupled to a valve operating rod which is accessible at the nozzle or delivery end of the hydrant and does not require exposure of the hydrant casing.

According to features of the invention, a valve assembly is provided adapted to be mounted in an elongated casing adapted for connection at an inner end portion thereof with a fluid source and having an opposite outer delivery end portion, the assembly including a valve seat body adapted to fit replaceably within the inner end portion of the casing, a movable valve member cooperating with the valve seat body, valve operating means for the valve member extending therefrom and beyond the valve seat body for access adjacent to the delivery end portion of the casing, means for removably connecting the valve operating means to the outer end portion of the casing, means coupling the operating means in a unitary assembly with the valve member and the valve seat body enabling the operating means to actuate the valve member between valve open and valve closed positions relative to the valve seat member and enabling insertion of the valve seat body and the valve member together into the casing and removal thereof together from the casing through the outer end portion of the casing as permitted by the unitary assembly with the operating means, the valve seat body including an annular seat portion with which the valve member is engageable in closing relation, the valve operating means including an actuating member attached to the valve member, a concentric guide on the body through which the actuating member extends reciprocatably for moving the valve member between valve open and valve closed positions relative to the valve seat portion, and biasing means acting between the guide and the actuating member to maintain an engagement bias of the valve seat body toward the shoulder in the casing within which the valve assembly may be mounted.

BRIEF DESCRIPTION OF THE DRAWINGS

FIG. 1 is a fragmental side elevational view of a post-type hydrant embodying features of my invention;

FIG. 2 is a vertical sectional view taken substantially along line II—II of FIG. 1 with the parts shown in solid line in the shut-off position and in phantom line open valve position;

FIG. 3 is an exploded view of parts of the valve structure in FIG. 2;

FIG. 4 is a sectional detail view taken substantially along line IV—IV of FIG. 2;

FIG. 5 is a fragmentary longitudinal sectional view of a wall-type hydrant incorporating therein another embodiment of my invention;

FIG. 6 is an enlarged sectional detail view taken substantially along line VI—VI of FIG. 5;

FIG. 7 is an exploded view of parts of the embodiment of FIGS. 5 and 6;

FIG. 8 is a sectional detail view taken substantially along line VIII—VIII of FIG. 6;

FIG. 9 is a fragmentary longitudinal sectional detail view illustrating still another embodiment of my invention;

FIG. 10 is a top plan view showing a floor or ground level access box hydrant structure embodying the invention; and FIG. 11 is an enlarged vertical sectional detail view taken substantially along the line XI—XI of FIG. 10.

DESCRIPTION OF PREFERRED EMBODIMENTS

This invention provides an improved frostproof hydrant structure which includes a valve seat-valve body assembly adapted for easy removal from and replacement within the hydrant casing without danger of misalignment of the valve mechanism, and without requiring removal of or external access to the casing.

Generally, at least three different types of frostproof hydrants are required to fulfill various needs. A post-type hydrant is useful in situations where the fluid point demand must be above ground level, such as in a railroad yard where the nozzle end must be at least thirty inches above the ground line for providing fresh potable water to passenger cars and diners or the like or at parks, truck and bus stops, vacation areas, etc. where the nozzle end must be above ground level. A wall-type hydrant is useful in situations where the fluid point of demand is at an outer wall of a structure, such as at an outside building wall. A ground-type hydrant is useful in situations where the fluid point of demand may be at ground level and structure protruding above the ground line is objectionable, as in golf courses, cemeteries, shopping center malls, recreational areas, etc. Each type of hydrant includes an elongated casing having a select bury depth dimension, i.e. the ground or wall dimension beyond which freezing does not occur at given geographical areas. Thus, hydrants intended for use in the railroad yard should have the casing with a bury depth dimension of 3 to 5 feet, depending upon the climatic conditions expected at a given yard location. Valve mechanisms for regulating the flow of fluids from a source thereof to the point of demand are located within the hydrant casing and generally well below the bury depth dimension of the hydrant so as to be protected from freezing.

FIG. 1 illustrates a post-type frostproof hydrant structure 10 constructed in accordance with the principles of the invention. The hydrant 10 generally comprises a hollow casing 11 which may be formed of a single pipe or a plurality of pipe sections, for example, 11a, 11b and 11c, which are joined to one another via conventional thread couplings. One end of casing 11, for example, the free end of pipe section 11c, is operationally connected to a source of fluid, such as water, under pressure (not shown) and the other end of casing 11 is connected to a point of demand of a delivery end 13, which may be a conventional nozzle as shown or some other type structure.

A unitary valve mechanism or unitary valve seat-valve body assembly 17 (best seen, for example, at FIG. 2), constructed in accordance with the principles of the invention is positioned within casing 11 and is coupled with a valve operating rod 12 for selectively controlling fluid flow between a pressurized fluid source and the delivery end 13 of hydrant 10. Desirably, the unitary valve mechanism 17 comprises a hollow assembly body 18 which has an outer surface 18a for snugly fitting within casing 11 and an inner surface 18b for defining the flow chamber through the valve mechanism. The inner surface 18b includes a lower wall portion 19 having a beveled surface area 19a which defines a valve seat 20. A valve body 21 is positioned within assembly body 18 in operating relation with valve seat 20 and is axially movable relative to the valve seat 20 between a closed position C (shown in full line) and an open position O (shown in dotted line) within assembly body 18 for controlling fluid flow past the valve seat.

The hollow assembly body 18 comprises a hollow cylindrical casting 22 having an outer surface 23 which includes an annular groove 23a about the outer periphery thereof. An O-ring 23b fits within groove 23a and aids in forming a seal between the outer surface 23 of casting 22 and the inner periphery of the hydrant casting, for example, pipe section 11b. The casting 22 includes an inner surface 24 which has a beveled portion 25 for defining the valve seat 20, an up-facing edge 22a which joins the beveled portion 25 to the outer surface 23 and a pair of upstanding arms 26 integrally joined to a hollow collar 27 to define a valve body cage within casting 22. The collar 27 is provided with an aperture 27a which allows a rod or the like to pass into a casting 22 to operate the valve body as will be described hereinafter.

A valve operating rod 12 is located within casing 11 and is mechanically joined at its upper end 12a to a hydrant operating means 14 which may be in the form of a handle, and is mechanically joined at its lower or inner end portion 12b to the valve mechanism 17. Operating means 14 has been illustrated at FIG. 1 as an up-down movable handle, however, it may comprise a key-rotatable member or other suitable hydrant operating means, whether manually activated or power activated and may be suitably mounted on the nozzle 13. The outer end portion of the rod 12 is removably connected by means of the nozzle 13 and the handle 14 to the outer end portion of the casing section 11a.

For coupling the valve operating means rod 12 in unitary assembly with the valve member 21 and the valve seat body 18, the lower end portion 12b of the rod 12 may be provided with an extension 12bb connected to a valve stem 31 which slidably passes through the bearing aperture 27a of the collar 27 on the casting 22 and is mechanically joined to the valve body 21. The valve body 21 is thus axially movable by the rod 12 in relation to the valve seat 20 between open and closed positions of the mechanism within the cage in the body 18 but is maintained by the generally convergent portion 26a of the legs 26 and the integral seat ring 19 in unitary assembly with the body 18.

A worker desirous of inspecting and/or replacing the valve mechanism 17 or portions thereof, merely removes the nozzle 13 as be engaging wrench faces 13a and unscrewing the nozzle from the casing section 11a, thereby opening the outer end of casing 11. The operating rod 12 can then be pulled from the exposed upper end of the hydrant 10 and thereby pull the coupled valve mechanism 17 from the casing 11 which throughout its length from the shoulder 11bb to its outer end is of no smaller inside diameter than the outside diameter of the body 18. Once the valve mechanism is inspected and, if necessary, disassembled to replace worn or damaged parts thereof, the unitary valve seat-valve body assembly 17 is recoupled to the rod 12 and reinserted within the casing 11. No special tools or alignment techniques are required for proper positioning of the valve seat 20 or the valve member 21 since they are in the unitary assembly relationship. Further, there is no need to dig up surrounding ground or the like to expose casing portions which encompass the valve mechanism. It is therefore extremely simple and economical to inspect and/or replace mechanism or parts thereof constructed in accordance with the principles of this invention.

The post-type hydrant structure 10 is buried in ground for a select bury depth, diagrammatically indicated by dotted line D. The bury depth for a given hydrant is selected in relation to a geographical area so as to be below the prevalent frost line in that area.

If fluid remained within the casing above the bury depth it might freeze and cause damage and/or non-operation of the hydrant 10. To drain such fluid a bleed hole port 15 may be provided in the hydrant casing 11 at a location below the bury depth of the hydratn but above the valve assembly 17. The bleed hydrant 15 allows any fluid that remains within the casing after valve shut-off to drain off below the bury depth D of the casing and to surrounding ground. As shown in FIG. 2, one of the pipe sections forming the hydrant casing, such as section 11b, may be provided with a nipple 15a about the bleed port 15, providing a drain passage between the interior of pipe section 11b and the exterior thereof. If desired, a section of pipe 15b may be joined, as by appropriate threads to nipple 15a to transport the draining fluid away from casing 11. A sump, gravel, or the like may be provided at the outer end of the nipple 15a or pipe section 15b as an aid in draining fluid away. The exact location of the port 15 is not overly critical as long as it is located below the bury depth D and above the valve seat 20 of a given hydrant.

In the embodiment illustrated at FIG. 2, the unitary valve mechanism 17 is located below the bleed hole 15 and well below the bury depth D so as to be fully protected from freezing conditions.

The valve stem 31 is attached at its lower end to the valve body 21 by means of a screw 32a in a conventional manner. A pair of washers 32b may be provided to clamp and reinforce the valve member 21 therebetween. The member 21 is preferably composed of a resilient fluid impermeable material, such as synthetic or natural rubber, for example, neoprene or a suitable plastic material capable of forming an efficient seal with the valve seat 20. The lower edge 21a of the valve member 21 may be beveled for improved mating with the valve seat 20.

At its upper end 31a the stem 31 may be threaded for coupling with the valve operating rod 12 by means of a hollow cylindrical seal member 41. A securement nut 33 may be threaded on a protruding upper end portion 31a of the end to insure that stem 31 is not accidentally disconnected from body 18 while in service. As shown, the cage provided by arms 26 prevents the valve body 21 from escaping from its assembly with the valve cage body 18.

Biasing means comprising a compression spring 29 may be mounted about the stem 31 and above the collar 27 so that one end of the spring is seated against the collar 27 and the other end is seated against a lower collar 46 of the seal member 41. The spring 29 urges the body 18 downwardly or inwardly against the internal shoulder 11bb of the pipe section 11b in the closed position C of the hydrant but allows axial upward or outward movement of stem 31 to the open position O. The spring 29 is mounted under compression to continuously urge body 18 away from member 41 and thereby assure opening of the valve when desired.

The hollow tubular cylindrical seal member 41 includes an outer peripheral surface 42 which is provided with at least one and preferably two annular grooves 43. Suitable O-rings 43a fit within grooves 43 and aid in forming a seal between surface 42 and the inner periphery of casing 11. The upper end of the member 41 and the upper seal 43a are located below the drain port 15 in the valve closed position C as shown. The lower groove 43 is so positioned on surface 42 that when the seal member 41 moves upwardly to the open position O (phantom position) of the valve mechanism, the lower seal ring 43a remains below the bleed hole port 15 and prevents up-flowing fluid from exiting through the bleed hole. The space between the seal rings 43a is selected so as to be wider than the diameter of bleed hole 15 for completely sealing the bleed hole from fluid within casing 11 in the open position O. The seal member 41 includes an inner annular bore surface 44 which defines a flow passage through the seal member. Oppositely extending pairs of spider arms 45 on the ends of the member 41 integrally join uppper and lower spaced hollow collars 46 to the member. These collars are provided with internal threads 46a for coupling with the lower end 12b of the valve operating rod 12 and with the upper end 31a of stem 31 respectively. Securement nuts 33 and 33' are, respectively, threaded onto the threaded portions of stem 31 and rod 12 to insure against unintentional separation of the parts.

In operation, the operating means 14 may be manually actuated, as by moving the handle upwardly, so that valve rod 12 is moved axially uupwards to open valve 21. This causes seal member 41 to move upwardly a corresponding distance so that the O-rings 43a in grooves 43 straddle and seal bleed hole 15, as shown in phantom outline. Stem 31 is moved with member 41 and causes the valve body 21 to become unseated from valve seat 20 and opens a continuous flow passage from the pressurized fluid source to the point of demand 13. After the demand for fluid has been satisfied, a reverse procedure may be effected. The operating means 14 is depressed, as by moving the handle downwardly, pushing rod 12 downwardly a corresponding distance. Seal member 41 moves down sufficiently to open bleed hole 15 and fluid thereabove immediately drains from the hydrant casing. Valve stem 31 being rigidly coupled with the lower collar 46 of member 41 moves downwardly a corresponding distance and forces the valve member 21 against the valve seat 20 to shut off fluid flow. Fluid below bleed hole 15 being well below the bury depth of the hydrant is not liable to freezing conditions.

FIGS. 5–9 show embodiments of the hydrant structures 100 and 100' constructed in accordance with the principles of the invention and adapted to be mounted generally horizontally in a building wall BW. There is a substantial similarity between the wall-type hydrant structure 100 and 100' of FIGS. 5–9 and the post-type hydrant structures of FIGS. 1–4. Accordingly the various elements of FIGS. 5–9 which correspond to elements previously described will be designated by the same reference numeral in the 100 series. Thus, the wall-type hydrant structure 100 comprises a hollow casing 111, which may be formed of a plurality of pipe sections 111a, 111b, 111c and 111b which may be conventionally connected to form a unitary flow passage. The portion of the casing 111 which houses a unitary valve mechanism 117 or 117', such as pipe section 111c, may be provided with an expansion chamber 111cc and an annular shoulder 111bb adjacent the outer end of the chamber for seating thereagainst of the valve seat ring 119 of the mechanism 117, 117'. One end of the casing 111, for example the inner end of pipe section 111d is operationally connected to a pressurized source of fluid (not shown) and the other end of the casing 111 is connected to a point of demand or delivery point 113, such as the externally threaded generally downwardly extending nozzle shown.

The unitary valve seat-valve body assembly 117 or 117' (best seen at FIGS. 6 and 9 respectively) is positioned within casing 111 coupled to the valve operating rod 112 for selectively controlling fluid flow between the fluid source and the delivery end 113. The valve mechanism or assembly 117, 117' is similar to the assembly 17 and comprises a hollow assembly body 118 which has an outer surface 118a for snuggly fitting within casing 111 and an inner surface 118b defining a flow chamber through the valve assembly 117, 117'. The seat ring 119 of body 118 of assembly 117 is provided with a bevelled valve seat area 120 on its inner end. A valve body 121 is positioned with the casing chamber 111cc in working relation to valve seat 120 and is axially movable relative to the valve seat between a closed position C and an open inwardly displaced position O, for controlling fluid flow past the valve seat.

In the arrangement of FIG. 9, the valve seat ring 119 has the beveled valve seat area 120 on its outer end similarly as the arrangement in FIG. 2 so that in the closed position C of the valve body 121 it thrusts inwardly against the valve seat 120, and for opening the valve the valve body 121 is backed off outwardly away from the valve seat 120 to a position as indicated in phantom at O.

The hollow assembly body 118 in both FIGS. 6 and 9 comprises a hollow generally cylindrical casting 122 having an outer surface 123 which includes at least one annular groove 123a thereabout. An O-ring 123b fits within groove 123a as a seal between the outer periphery of casting 122 and the inner periphery of casing 111. Extending from the seat ring 119 is a pair of outwardly extending arms 126 integrally joined to a sleeve-like collar 127 provided with an axial bore 127a through which an inner end portion 112b of the valve actuating rod 112 is slidably guided. At its outer end portion 112a the rod is provided with means 114 for rotatably operating it which may comprise a keyed head for removably receiving an actuating lever or handle, or a handle or lever may be attached thereto. This operating end portion of the rod is rotatably connected to a suitable fitting 114a which holds the rod against axial displacement but permits free rotary movements of the rod, suitable packing or seal rings 114b preventing leakage past the rod. Through this arrangement, opening and closing movements of the valve body 121 are effected by means of a screw coupling of the inner end portion 112b of the rod and the valve stem 131 which is coaxially secured to the valve body 121 as by means of a screw 131b with washers 132a and 132b clamping the valve body therebetween. In a desirable form, the screw coupling between the actuating rod and the valve stem comprises a rotary to reciprocating motion coupling including external square threads 116 on the rod end portion 112b coupled with internal complementary tapped threads 131a in an axial outwardly opening bore 131c in the stem 131. When the rod 112 is turned clockwise the valve body 121 is drawn into closing relation to the valve seat 120 in FIG. 6, and is thrust toward the valve seat 120 in FIG. 9. When the actuating rod 112 is turned in counterclockwise direction, the valve body 121 is unseated inwardly in FIG. 6 and is unseated outwardly in FIG. 9. To assure axial seating and unseating movements of the valve body 121, means are provided to restrain the valve stem 131 against turning, herein comprising a pair of oppositely radially extending ear lugs 131d which ride in longitudinally extending grooves 126a provided on the inner sides of the legs 126.

Biasing means comprising a coiled compression spring 129 acting between the outer end of the collar 127 and a washer 129a held in place by a transverse pin 134 through the rod portion 112b normally thrusts the body 118 toward the shoulder 111bb, the inner end of the seat ring 119 being roughened or serrated at 119a to bite against the shoulder and anchor the body 118 against turning.

In the operation of the arrangements of FIGS. 5–9, opening of the valve 121 permits outflow of liquid through the passage provided by casing 111 and the outlet 113. When the valve is closed, any liquid remaining downstream from the valve 121 freely drains from the casing through the outlet 113. To aid in this drainage action, the casing 111 may be slightly tilted downwardly to the outside of the wall BW. Freezing of water in the pipe casing 111 downstream from the valve 121 is substantially precluded by virtue of the valve being located substantially inwardly relative to the wall BW, and assuming that nonfreezing temperature prevails within the enclosure inside the wall BW.

For servicing the valve assembly 117 or 117', removal of the fixture 114a provides an opening 135 at the outer end of the casing 111 of at least as large a diameter as the inside diameter of the casing, whereby the entire unit including the rod 112 and the valve assembly 117 or 117' can be drawn out of the casing 111. After effecting any necessary adjustments or repairs, the entire unit can be quickly reinserted into the casing 111 and by securing the fixture 114a in the opening 135 as by means of a threaded coupling interconnection, the apparatus is again in operating condition.

Adaptation of the invention to a ground-type hydrant is depicted in FIGS. 10 and 11, and it will be observed that the control valve structure is similar to that shown in FIG. 2. For ground hydrant purposes, a ground level access box 137 is provided to be located flush with or below ground level GL and with a cover 138 hingedly connected as at 138a with one side of the body of the housing 137. Protectively enclosed within the housing 137 under the cover 138 is an externally threaded faucet nipple 139 projecting upwardly and adapted to have a conduit such as a hose coupled in communication therewith. In this instance the faucet 139 comprises a lateral extension from a hollow upwardly opening valve control well head 140 on the upper end of an upper casing section 211a of a casing 211 comprising also an intermediate lower aligned casing section 211b coupled at its upper end with the casing section 211a and coupled at its lower end with a lower casing section 211c and providing a flow passage leading to the faucet 139. Within the casing sections 211b and 211c is mounted valve structure corresponding to the valve structure generally according to the present invention in FIG. 2, including a unitary valve mechanism or unitary valve seat-valve body assembly 217 including a hollow body 218 provided with a ring valve seat 219 carrying a sealing ring 223 in sealing engagement with the inner wall defining the section 211c and seated on an annular shoulder 211bb integral with the casing. A valve body 221 is engageable with a valve seat 220 provided by the seat ring 219 and is guided within a cage provided by upwardly extending arms 226 integral with the seat ring 219 and connected integrally with a sleeve collar 227 concentrically slidably guiding a valve stem 231 which projects thereabove and extends through and is coupled by a nut 233 to a lower collar 246 connected by spider arms 245 to a cylindrical seal body 241. At its upper end the seal body 241 is connected by upper spider arms 245 to an upper coaxial collar 246 to which is coupled the lower end portion of a rotary valve actuating rod 212. On its upper end the rod 212 has a valve operating key or handle receiving head 214 projecting upwardly within the hollow well head 140 and to which a separable handle can be applied when the cover 138 is opened for access thereto. By turning the heat 214 and thus the rod 212, opening or closing of the valve 221 and corresponding opening or closing of the drain port 215, located below frost line, by means of the seal member 241 is effected, similarly as described in connection with the apparatus of FIG. 2. Operative support for the rod 212 is provided by means of fitting comprising a supporting closure disk element 250 seated on a shoulder 251 and removably secured by a ring nut 252 threaded into the well head 140. A packing or seal ring 253 assures a leakproof joint between the element 250 and the rod 212. To hold the head end portion of the rod against vertical displacement, the lower end of the head 214 has a shoulder 214a and a collar washer 216 is secured about the rod under the disk 250 as by means of a pin 255.

On its lower end portion the rod 212 has a motion transmission coupling with the seal body 217 comprising threads 212a engaging in the complementally threaded upper collar 246 of the member 241. Thus, rotary movement of the rod 212 effects reciprocable movement of the member 241 and valve member 221 as a unit for valve opening and closing. Turning of the rod 121 clockwise will effect downward movement of the valve 221 onto its seat 220. At the same time a compression spring 229 which normally acts to thrust the body 218 from the member 241 is placed under additional compression between the collar 227 and the lower collar 246. Turning of the rod 212 in counterclockwise direction will effect opening of the valve 221 and movement of the member 241 into sealing relation to the port 215.

It may be noted that because the coupling 212a/246 is below frost line adjacent the port 215, danger of freeze locking of the threaded transmission coupling 212a/246 is avoided.

Assembly of the valve mechanism into position as a unit is easily effected through the bore of the head 140 into the casing 211 and then securing the same in place by means of the ring nut 252. Removal of the entire valve assembly including the valve seat ring 219 is easily effected by removing the ring nut 252 and pulling the entire assembly from the continuous bore provided by the casing 211 and the head 140. To assist in this, the inner, lower end portion of the rod 212 extends normally slightly below the upper collar 246 and has secured thereto a larger diameter stop member such as a nut 212b which may be suitably locked against unintentional separation.

At its lower tip end the rod 212 provides a fixed stop against which the upper end tip of the stem 231 may engage to define the fully open position of the valve 221 and assurance that the member 241 is in full relation to the port 215.

It will be understood that variations and modifications may be effected without departing from the spirit and scope of the novel concepts of this invention.

I claim as my invention:

1. In a frostproof hydrant structure including an elongated casing adapted for connection at an inner end portion thereof with a freeze-protected fluid source and having an opposite outer delivery end portion which may be exposed to freezing conditions, valve means within said casing adjacent to said inner end portion for controlling fluid flow from said fluid source to said delivery end portion, valve operating means accessible adjacent to said delivery end portion, said valve means including a valve seat body fitting replaceably within said inner end portion of the casing and a movable valve member cooperating with said valve seat body, means removably connecting the valve operating means to said outer end portion of the casing, means coupling said operating means in a unitary assembly with said valve member and said valve seat body, enabling the operating means to actuate the valve member between valve open and valve closed positions relative to said valve seat body and enabling insertion of the valve seat body and the valve member together into the casing and removal thereof together from the casing through said outer end portion of the casing as permitted by the unitary aassembly with the operating means; said valve seat body including an annular seat portion with which the valve member is engageable in closing relation, said valve operating means including an actuating member attached to said valve member, a concentric guide on said body through which the actuating member extends for moving said valve member between valve open and closed positions relative to said valve seat portion, the improvement comprising:

a shoulder in said casing against which said valve seat body engages; and biasing means acting between said guide and said actuating member to maintain an engagement bias of the valve seat body toward the shoulder.

2. A structure according to claim 1, wherein said valve actuating member comprises a reciprocating rod connected with a valve stem attached to said valve member, for effecting reciprocation of the valve member between the valve open and valve closed positions.

3. A structure according to claim 1, wherein said valve actuating member includes a valve stem, means guiding the valve stem reciprocatably in said valve seat body, and a rotatable actuating rod having a rotary to reciprocating motion coupling with said valve stem.

4. A structure according to claim 3, wherein said valve seat body has a valve seat which faces inwardly relative to said casing, and said valve member is movable inwardly into the valve open position and is movable outwardly into the valve closed position.

5. A structure according to claim 3, wherein said valve seat body has a valve seat which faces outwardly relative to said casing, and said valve member is movable outwardly relative to the valve seat into the valve open position and is movable inwardly relative to the valve seat into the valve closed position.

6. A structure according to claim 1, wherein said casing has a drain port above said valve seat body and below frost line, and a sealing device comprising part of said valve operating means and operable to close said port in the valve open position and to open the port in the valve closed position.

7. A structure according to claim 6, wherein said device comprises a tuubular sealing sleeve coaxially coupled between said valve member and providing fluid passage therethrough, said sealing sleeve being of a length to extend across and block said port in the open valve position and being located to clear the port for drainage in the closed valve position.

8. A structure according to claim 1, wherein said delivery end portion comprises a nozzle removably attached to said casing, and said valve operating means includes a handle mounted on said nozzle, said unitary assembly being adapted to be pulled from the casing upon detaching the nozzle from the casing.

9. A structure according to claim 1, including a fitting at said delivery end portion of the casing, and said valve operating means including an operating rod connected with said fitting and operable when the fitting is attached to the casing for actuating said valve member between the valve open and valve closed positions, and the assembly being adapted to be pulled from the casing when the fitting is detached from the casing.

10. A structure according to claim 1, wherein said valve operating means include a reciprocatable operating rod, means for guiding the rod recipprocatably, and means separably mounted on the delivery end portion of the casing and mounting the rod in operating relation to the casing and said assembly and being releasable from the casing for pulling the rod and the assembly from the casing.

11. In a frostproof hydrant structure including an elongated casing adapted for connection at an inner end portion thereof with a freeze-protected fluid source and having an opposite outer delivery end portion which may be exposed to freezing conditions, valve means within said casing adjacent to said inner end portion for controlling fluid flow from said fluid source to said delivery end portion, valve operating means accessible adjacent to said delivery end portion, said valve means including a valve seat body fitting replaceably within said inner end portion of the casing and a movable valve member cooperating with said valve seat body, means removably connecting the valve operating means to said outer end portion of the casing; means coupling said operating means in a unitary assembly with said valve member and said valve seat body, enabling the operating means to actuate the valve member between valve open and valve closed positions relative to said valve seat body and enabling insertion of the valve seat body and the valve member together into the casing and removal thereof together from the casing through said outer end portion of the casing as permitted by the unitary assembly with the operating means, said casing having a drain port above said valve seat body and below front line, a sealing device comprising part of said valve operating means and operable to close said port in the valve open position and to open the port in the valve closed position, said device comprising a tubular sealing sleeve coaxially coupled between said valve member and providing fluid passage therethrough, said sealing sleeve being of a length to extend acrosss and block said port in the open valve position and being located to clear the port for drainage in the closed valve position, the improvement comprising:
 a shoulder in said casing facing toward said delivery end;
 said valve seat body including an annular valve seat portion eengaging said shoulder and having arms on said annular portion extending away from said shoulder and connected to an axial guide;
 said operating means including a valve stem attached to the valve member and extending reciprocatably through said guide;
 means coupling the valve stem to said sealing sleeve; and
 biasing spring means acting between said guide and said sealing sleeve for normally biasing said valve seat body toward said shoulder.

12. In a valve assembly adapted to be mounted in an elongated casing adapted for connection at an inner end portion thereof with a fluid source and having an opposite outer delivery end portion, a valve seat body adapted to fit replaceably within the inner end portion of the casing, a movable valve member cooperating with said valve seat body, valve operating means for said valve member extending therefrom and beyond said valve seat body for access adjacent to said delivery end portion of the casing, means for removably connecting the valve operating means to said outer end portion of the casing; means coupling said operating means in a unitary assembly with said valve member and said valve seat body, enabling the operating means to actuate the valve member between valve open and valve closed positions relative to said valve seat member and enabling insertion of the valve seat body and the valve member together into the casing and removal thereof together from the casing through the outer end portion of the casing as permitted by the unitary assembly with the operating means; said valve seat body including an annular seat portion with which the valve member is engageable in closing relation, said valve operating means including an elongated actuating member, attached to said valve member, a concentric guide on said body through which the actuating member extends for moving said valve member between valve open and valve closed positions relative to said valve seat portion, the improvement comprising:
 biasing means acting between said guide and said actuating member to maintain a bias of the valve seat body toward a shoulder in a casing within which the valve assembly may be mounted.

13. A valve assembly according to claim 12, wherein said valve actuating member comprises a reciprocating rod connected with a valve stem attached to said valve member, for effecting reciprocation of the valve member between the valve open and valve closed positions.

14. A valve assembly according to claim 12, wherein said actuating member comprises a rotary rod, a valve stem on said valve member, and a rotary to reciprocating motion coupling between said rod and said valve stem.

15. A valve assembly according to claim 14, wherein said valve seat body has a valve seat which faces inwardly relative to said valve seat body, and said valve member is movable inwardly into the valve open position and is movable outwardly into the valve closed position.

16. A valve assembly according to claim 14, wherein said valve seat body has a valve seat which faces outwardly relative to said valve seat body, and said valve member is movable outwardly relative to the valve seat into the valve open position and is movable inwardly relative to the valve seat into the valve closed position.

17. In a frostproof hydrant structure including an elongated casing adapted for connection at an inner end portion thereof with a freeze-protected fluid source and having an opposite outer delivery end portion which may be exposed to freezing conditions, valve means within said casing adjacent to said inner end portion for controlling fluid flow from said fluid source to said delivery end portion including a valve seat body adapted to fit replaceably within said inner end portion of the casing and having a movable valve member operating within said valve seat body, valve member operating means accessible adjacent to said delivery end portion for actuating the valve member between a valve open position and a valve closed position; said casing having a drain port opening therefrom, outwardly spaced from said valve means and inwardly spaced from said delivery end portion and inwardly from a frost line; a sealing member movable between a port closing position and a port open position, means coupling said sealing member with said valve operating means for concurrent movement of the sealing member with actuation of said valve member so that the sealing member is moved into port open position when the valve member is actuated into valve closed position and the sealing member is moved into port closing position when the valve member is moved into valve open position, the improvement comprising:

a shoulder in said casing against which said valve body engages; and biasing means acting between said valve body and said sealing member to maintain an engagement bias of the valve body toward said shoulder.

18. A structure according to claim 17, wherein said valve operating means comprises a movable rod, and said sealing member comprises a sleeve reciprocatably mounted in the casing and coupled to and between the rod and the valve means.

* * * * *